US012803034B2

(12) United States Patent
Chen et al.

(10) Patent No.: US 12,803,034 B2
(45) Date of Patent: Nov. 17, 2026

(54) BATTERY CELL INSULATING FILM WRAPPING DEVICE INCLUDING PUSH MECHANISM, DEFINING MECHANISM, EDGE FOLDING MECHANISM, AND DRIVING UNIT

(71) Applicant: CONTEMPORARY AMPEREX TECHNOLOGY CO., LIMITED, Ningde City (CN)

(72) Inventors: Jinliang Chen, Ningde City (CN); Tingting Yang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 756 days.

(21) Appl. No.: 18/315,509

(22) Filed: May 11, 2023

(65) Prior Publication Data

US 2023/0282871 A1 Sep. 7, 2023

Related U.S. Application Data

(63) Continuation of application No. PCT/CN2022/102214, filed on Jun. 29, 2022.

(30) Foreign Application Priority Data

Jul. 15, 2021 (CN) ........................ 202121614870.X

(51) Int. Cl.
*H01M 10/04* (2006.01)
*H01M 50/14* (2021.01)

(52) U.S. Cl.
CPC ....... *H01M 10/0404* (2013.01); *H01M 50/14* (2021.01)

(58) Field of Classification Search
CPC .......................... H01M 10/0404; H01M 50/14
(Continued)

(56) References Cited

FOREIGN PATENT DOCUMENTS

| | | | |
|---|---|---|---|
| CN | 107834093 A | | 3/2018 |
| CN | 207183432 U | * | 4/2018 |

(Continued)

OTHER PUBLICATIONS

International Search Report received in the corresponding International Application PCT/CN2022/102214, mailed Sep. 9, 2022.

*Primary Examiner* — Sean P Cullen
(74) *Attorney, Agent, or Firm* — K&L Gates LLP

(57) ABSTRACT

A device for wrapping insulating film around battery cell is provided. In some embodiments, the device includes a push mechanism, a defining mechanism, an edge folding mechanism, and a driving unit. The push mechanism includes a substrate for holding a battery cell and a push assembly, which includes a push block and a first restraint portion for limiting a position of the push block. The defining mechanism is disposed on a side of the substrate, and configured to define a position of the battery cell on the substrate. The edge folding mechanism is disposed opposite the push mechanism, and configured to fold an edge of an insulating film wrapped around the battery cell. The driving unit is configured to drive the edge folding mechanism to fold the edge of the insulating film wrapped around the battery cell and drive the push block to push the battery cell on the substrate.

13 Claims, 7 Drawing Sheets

(58) Field of Classification Search
USPC .................................................. 29/623.2, 730
See application file for complete search history.

(56) References Cited

FOREIGN PATENT DOCUMENTS

| | | | | | |
|---|---|---|---|---|---|
| CN | 108417882 | A | | 8/2018 | |
| CN | 109065938 | A | * | 12/2018 | .......... H01M 50/572 |
| CN | 208986117 | U | | 6/2019 | |
| CN | 209056560 | U | | 7/2019 | |
| CN | 210653750 | U | * | 6/2020 | |
| CN | 112736274 | A | | 4/2021 | |
| CN | 215119121 | U | | 12/2021 | |
| KR | 101287412 | B1 | * | 7/2013 | ............. B65B 11/48 |
| WO | 9202055 | A1 | | 2/1992 | |

* cited by examiner

BATTERY CELL INSULATING FILM WRAPPING DEVICE INCLUDING PUSH MECHANISM, DEFINING MECHANISM, EDGE FOLDING MECHANISM, AND DRIVING UNIT

CROSS-REFERENCE TO RELATED APPLICATIONS

This application is a continuation of International Application PCT/CN2022/102214, filed Jun. 29, 2022, which claims priority to Chinese Patent Application No. 202121614870.X, filed on Jul. 15, 2021 and entitled "DEVICE FOR WRAPPING INSULATING FILM AROUND BATTERY CELL", which are incorporated herein by reference in their entireties.

TECHNICAL FIELD

This application relates to the field of battery cell production and processing, and in particular, to a device for wrapping insulating film around battery cell.

BACKGROUND

In a production process of lithium batteries, battery cells need to be wrapped with insulating films. For details, refer to Chinese Patent Application with the granted publication number of CN 209056560 U, in which a battery cell film wrapping welding machine is disclosed. The welding machine includes a movable film wrapping assembly disposed on a workbench and configured to wrap a Mylar film around the periphery of the battery cell, the movable film wrapping assembly including a transmission device, a film wrapping platform frame assembly slidably disposed on the transmission device, a battery cell defining assembly configured to define the battery cell, a turnover assembly configured to turn over a bottom supporting plate, and a first film-wrapping defining assembly for Mylar film wrapping, where the battery cell defining assembly, the turnover assembly, and the first film-wrapping defining assembly are all disposed on the film wrapping platform frame assembly. The welding machine is further provided with a second film-wrapping defining assembly that fits with the first film-wrapping defining assembly and that is configured to define a position of the Mylar film and fold an edge of the Mylar film.

During the implementation of this application, the applicant has found the following problems in some cases:

In some cases, because no limitation is imposed on displacement of a push block of a battery cell, the battery cell is prone to insufficient push or excessive push which may cause collision damages to the battery cell and result in safety accidents.

SUMMARY

For this purpose, a device for wrapping insulating film around battery cell needs to be provided, to resolve the prior-art technical problem that because no limitation is imposed on displacement of a push block of a battery cell, the battery cell is prone to insufficient push or excessive push which may cause collision damages to the battery cell and result in safety accidents.

To achieve the foregoing objective, the applicant provides a device for wrapping insulating film around battery cell, including:

- a push mechanism, where the push mechanism includes a substrate for holding a battery cell and a push assembly disposed on the substrate, the push assembly includes a push block, and the push assembly further includes a first restraint portion for limiting a position of the push block;
- a defining mechanism, where the defining mechanism is disposed on a side of the substrate, and the defining mechanism is configured to define a position of the battery cell on the substrate;
- an edge folding mechanism, where the edge folding mechanism is disposed opposite the push mechanism, and the edge folding mechanism is configured to fold an edge of an insulating film wrapped around the battery cell; and
- a driving unit, where the driving unit is configured to drive the edge folding mechanism to fold the edge of the insulating film wrapped around the battery cell and drive the push block to push the battery cell on the substrate.

Different from some cases, the technical solution of this application is as follows: A push block, a first restraint portion for limiting a position of the push block, and a defining mechanism define a position of a battery cell, an edge folding mechanism folds an edge of an insulating film wrapped around the battery cell, a driving unit drives the push block to push the battery cell on a substrate, and a moving position of the push block is limited by the first restraint portion. In this way, the push block experiences neither understroke nor overstroke, and thus neither insufficient battery push nor collision damage to the battery cell occurs, thereby effectively reducing safety accidents caused by collision damage to the battery cell.

In an embodiment of this application, the first restraint portion is a restraint groove disposed on the push block.

In this way, with the restraint groove disposed on the push block, the moving position of the push block can be so limited as not to exceed a shape range of the restraint groove.

In an embodiment of this application, the push assembly further includes a slider fixing plate, a first slider, and a cam assembly, where a first sliding rail is disposed on the slider fixing plate, the first slider fits with the first sliding rail and slides along an extension direction of the first sliding rail, and the push block is fixed onto the first slider; and

- the cam assembly includes a cam fitting with the restraint groove, the cam slides along an extension direction of the restraint groove, and the cam and the restraint groove fit with each other to limit the position of the push block.

In this way, the push block is so disposed on the slider fixing plate through fitting of the first slider and the first sliding rail that the push block can push the battery cell. The cam slides in the restraint groove through fitting of the cam and the restraint groove so as to limit the position of the push block, so that the push block experiences neither understroke nor overstroke.

In an embodiment of this application, the driving unit is configured to drive the push block to slide along the extension direction of the first sliding rail while driving the cam to slide along the extension direction of the restraint groove, to push the battery cell on the substrate.

In this way, when the driving unit pushes the cam to slide in the extension direction of the restraint groove, the position of the push block is limited by the restraint groove, implementing that the push block slides along the first sliding rail to push the battery cell. This limits and accurately controls the position of the push block, and implements the push function as well.

In an embodiment of this application, the edge folding mechanism includes a connecting plate, a first edge folding assembly, and a second edge folding assembly, where a second sliding rail is disposed on the connecting plate, the first edge folding assembly is disposed on the second sliding rail through a second slider, the second edge folding assembly is disposed on the second sliding rail through a third slider, and the driving unit is configured to drive the first edge folding assembly and the second edge folding assembly to approach or leave each other to fold the edge of the insulating film wrapped around the battery cell.

In this way, the first edge folding assembly is disposed on the second sliding rail through the second slider, the second edge folding assembly is disposed on the second sliding rail through the third slider, and the driving unit can simultaneously drive the first edge folding assembly and the second edge folding assembly to approach or leave each other to fold the edge of the insulating film wrapped around the battery cell and automatically control edge folding.

In an embodiment of this application, the first edge folding assembly includes a first hinged fixing plate, the first hinged fixing plate is disposed on the second slider, the second edge folding assembly includes a second hinged fixing plate, and the second hinged fixing plate is disposed on the third slider; and the edge folding mechanism further includes a first hinge plate and a second hinge plate, where one end of the first hinge plate is hinged with the first hinged fixing plate, the other end of the first hinge plate is hinged with one end of the second hinge plate, and the other end of the second hinge plate is hinged with the second hinged fixing plate.

In this way, as the first hinge plate and the second hinge plate are respectively hinged with the first hinged fixing plate and the second hinged fixing plate, and the first hinge plate and the second hinge plate are hinged with each other, provided that the first hinge plate or the second hinge plate is driven to move, the second slider and the third slider can be driven to slide on the second sliding rail, and the first edge folding assembly and the second edge folding assembly are driven to approach or leave each other so as to automatically control edge folding and increase edge folding efficiency.

In an embodiment of this application, a hinge guide slot is disposed on the connecting plate, and a joint of the first hinge plate and the second hinge plate moves up and down in the hinge guide slot through a guiding shaft, so as to drive the first edge folding assembly and the second edge folding assembly to slide on the second sliding rail.

In this way, as the position of the guiding shaft is limited through the hinge guide slot, the first edge folding assembly and the second edge folding assembly can be driven to slide on the second sliding rail through the second slider and the third slider provided that the guiding shaft is driven to move up and down in the hinge guide slot, so that the first edge folding assembly and the second edge folding assembly approach or leave each other, improving stability of edge folding.

In an embodiment of this application, the driving unit is configured to drive the push block to push the battery cell on the substrate while driving the guiding shaft to move up and down in the hinge guide slot.

In this way, the driving unit can drive two mechanisms to move. To be specific, the driving unit can drive the first edge folding assembly and the second edge folding assembly to fold an edge, and the push block to push the battery cell on the substrate. This can save one driver unit, thereby reducing parts.

In an embodiment of this application, the defining mechanism includes a restraint base and a first restraint block disposed on the restraint base, and the first restraint block includes a second restraint portion and a third restraint portion that are configured to limit movement of the battery cell in a horizontal direction.

In this way, the second restraint portion and the third restraint portion can limit movement of the battery cell in the horizontal direction, which is convenient to attach the insulating film onto the battery cell.

In an embodiment of this application, the defining mechanism further includes a second restraint block disposed on the restraint base, and the second restraint block is configured to limit movement of the battery cell in a vertical direction.

In this way, the second restraint block is configured to limit movement of the battery cell in the vertical direction so as to limit the position of the battery cell in the vertical direction, ensuring that the position of the battery cell is fixed.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

A person of ordinary skill in the art can clearly understand various other advantages and benefits by reading the detailed description of the embodiments below. The accompanying drawings are merely intended to illustrate the embodiments and are not intended to limit this application. In addition, in all the accompanying drawings, same parts are indicated by same accompanying symbols. In the accompanying drawings.

Figure 1:
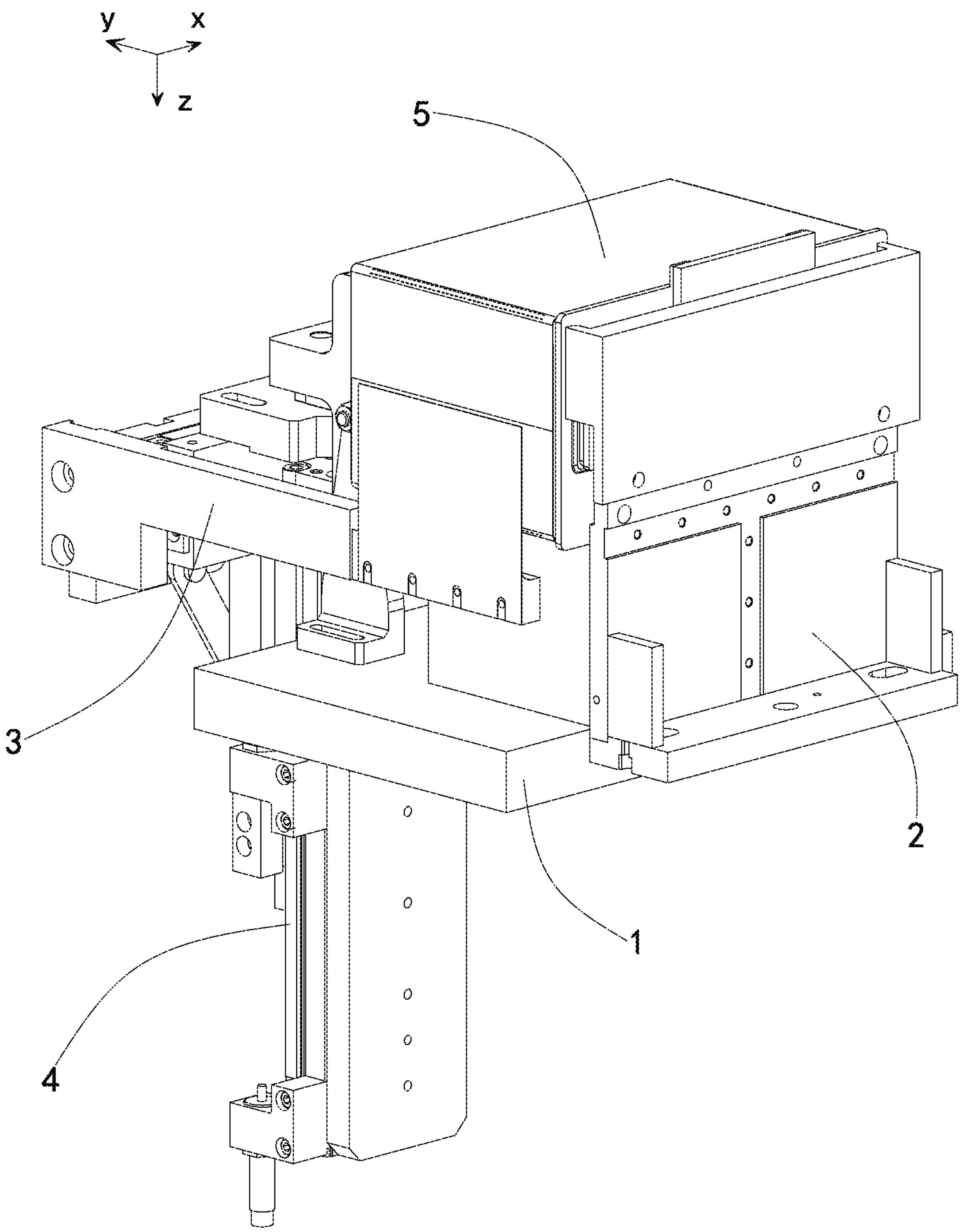
FIG. 1 is a three-dimensional diagram of a device for wrapping insulating film around battery cell according to an embodiment of this application.

1. push mechanism; 11. substrate; 12. push assembly; 121. push block; 122. first restraint portion; 123. slider fixing plate; 1231. first sliding rail; 124. first slider; 125. cam assembly; 1251. cam; 1252. cam mounting plate; 2. defining mechanism; 21. first restraint block; 211. second restraint portion; 212. third restraint portion; 22. second restraint block; 23. restraint base; 3. edge folding mechanism; 31. connecting plate; 311. second sliding rail; 312. hinge guide slot; 32. first edge folding assembly; 321. second slider; 322. first hinged fixing plate; 33. second edge folding assembly; 331. third slider; 332. second hinged fixing plate; 34. first hinge plate; 35. second hinge plate; 4. driving unit; and 5. battery cell.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the descriptions of embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

The direction indicated by arrow x in the figure is a length direction of a battery cell, the direction indicated by arrow y in the figure is a width direction of the battery cell, a combination of the direction indicated by arrow x and the direction indicated by arrow y is also a horizontal direction, the direction indicated by arrow z in the figure is a height direction of the battery cell, and the direction indicated by arrow z is also a vertical direction.

In a production process of lithium batteries, battery cells need to be wrapped with insulating films. However, in the prior art, because no limitation is imposed on displacement of a push block of a battery cell, the battery cell is prone to insufficient push or excessive push which may cause collision damages to the battery cell and result in safety accidents.

Figure 2:
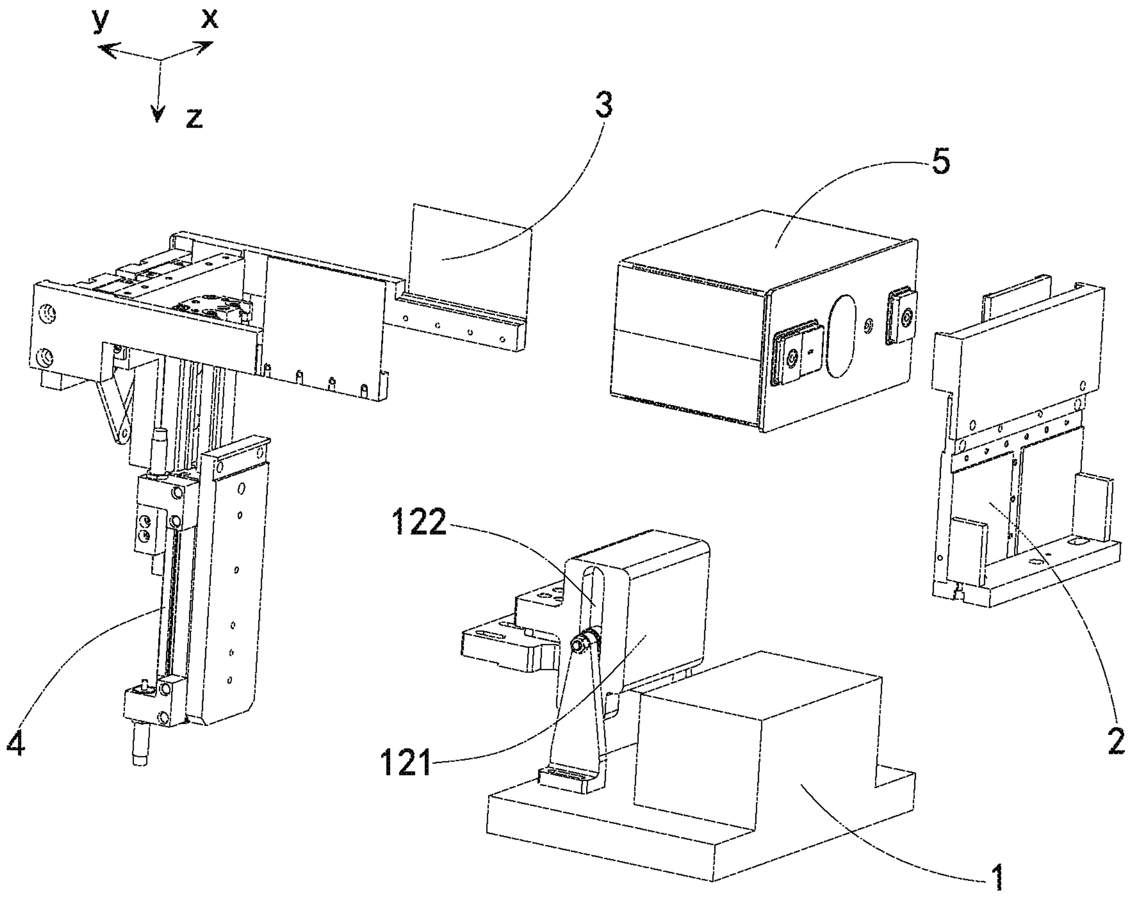
FIG. 2 is an exploded view of a device for wrapping insulating film around battery cell according to an embodiment of this application.

Therefore, an embodiment of this application provides a technical solution. Referring to FIG. 1 and FIG. 2, this embodiment relates to a device for wrapping insulating film around battery cell. The device includes a push mechanism 1, a defining mechanism 2, an edge folding mechanism 3, and a driving unit 4. The push mechanism 1 includes a substrate 11 for holding a battery cell 5 and a push assembly 12 disposed on the substrate 11, the push assembly 12 includes a push block 121, and the push assembly 12 further includes a first restraint portion 122 for limiting a position of the push block 121. The defining mechanism 2 is disposed on a side of the substrate 11, and the defining mechanism 2 is configured to define a position of the battery cell 5 on the substrate 11. The edge folding mechanism 3 is disposed opposite the push mechanism 1, and the edge folding mechanism 3 is configured to fold an edge of an insulating film wrapped around the battery cell 5. The driving unit 4 is configured to drive the edge folding mechanism 3 to fold the edge of the insulating film wrapped around the battery cell 5 and drive the push block 121 to push the battery cell 5 on the substrate 11.

It should be noted that in this embodiment, the first restraint portion 122 is not limited to a specific structure, provided that the position of the push block 121 can be limited. For example, the first restraint portion 122 is a restraint block, a restraint groove, a restraint hole, and the like, all of which are within the protection scope of this embodiment.

As compared with the prior art, in this embodiment, the push block 121, the first restraint portion 122 for limiting the position of the push block 121, and the defining mechanism 2 define a position of the battery cell 5, the edge folding mechanism 3 folds the edge of the insulating film wrapped around the battery cell 5, the driving unit 4 drives the push block 121 to push the battery cell 5 on the substrate 11, and a moving position of the push block 121 is limited by the first restraint portion 122. The push block 121 experiences neither understroke nor overstroke, and thus neither insufficient battery push nor collision damage to the battery cell 5 occurs, thereby effectively reducing safety accidents caused by collision damage to the battery cell 5.

In some embodiments, the first restraint portion 122 is a restraint groove disposed on the push block 121. Displacement of the push block 121 is limited by the restraint groove, and a moving position of the push block 121 and a moving range thereof depend on the shape and position of the restraint groove. A required push distance of the battery cell 5 is calculated based on an actual situation, and a shape range of the restraint groove is calculated based on the distance, ensuring a proper moving position of the push block 121, thereby avoiding understroke or overstroke of the push block 121.

In this way, with the restraint groove disposed on the push block 121, the moving position of the push block 121 can be so limited as not to exceed a shape range of the restraint groove.

Figure 3:
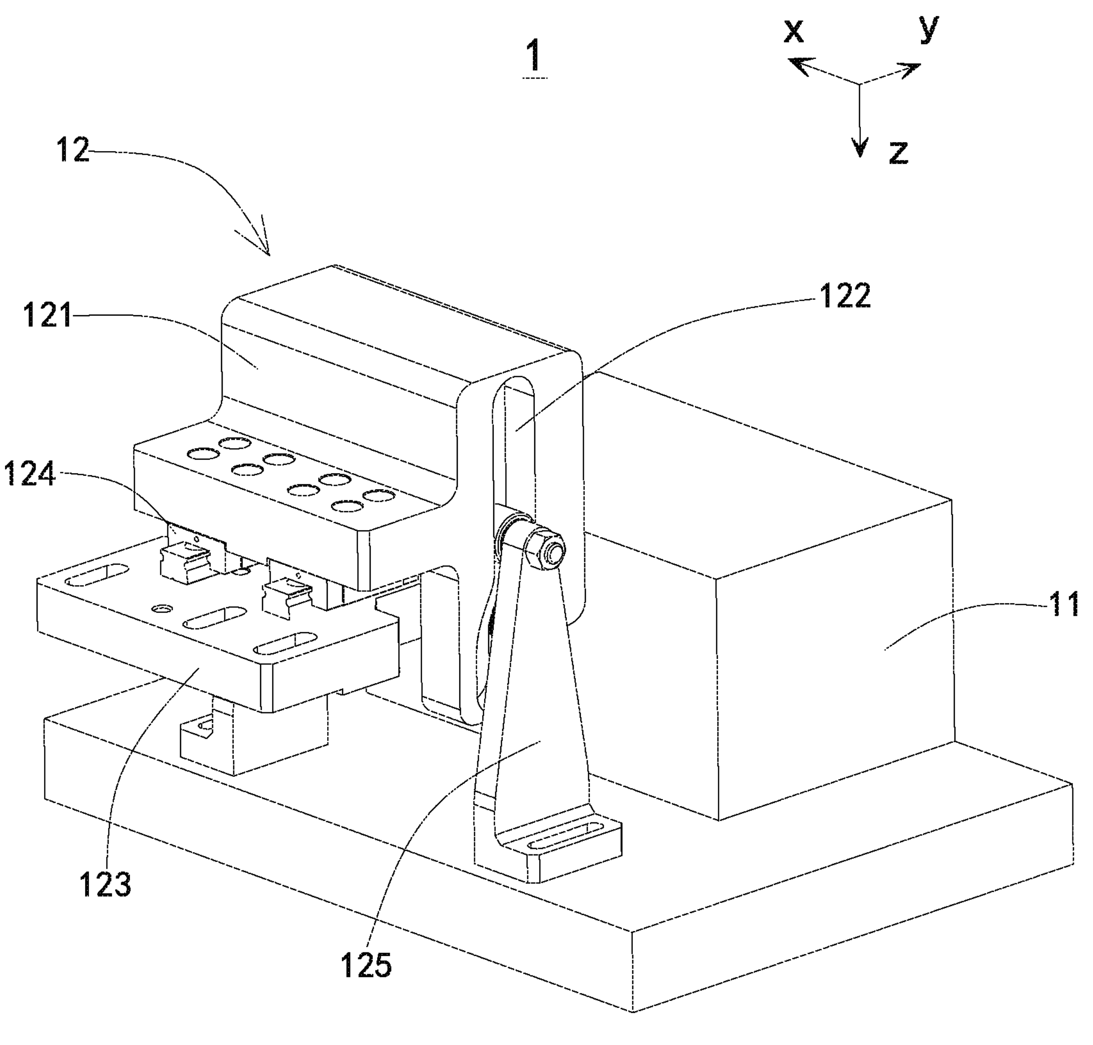
FIG. 3 is a three-dimensional diagram of a push mechanism according to an embodiment of this application.
Figure 4:
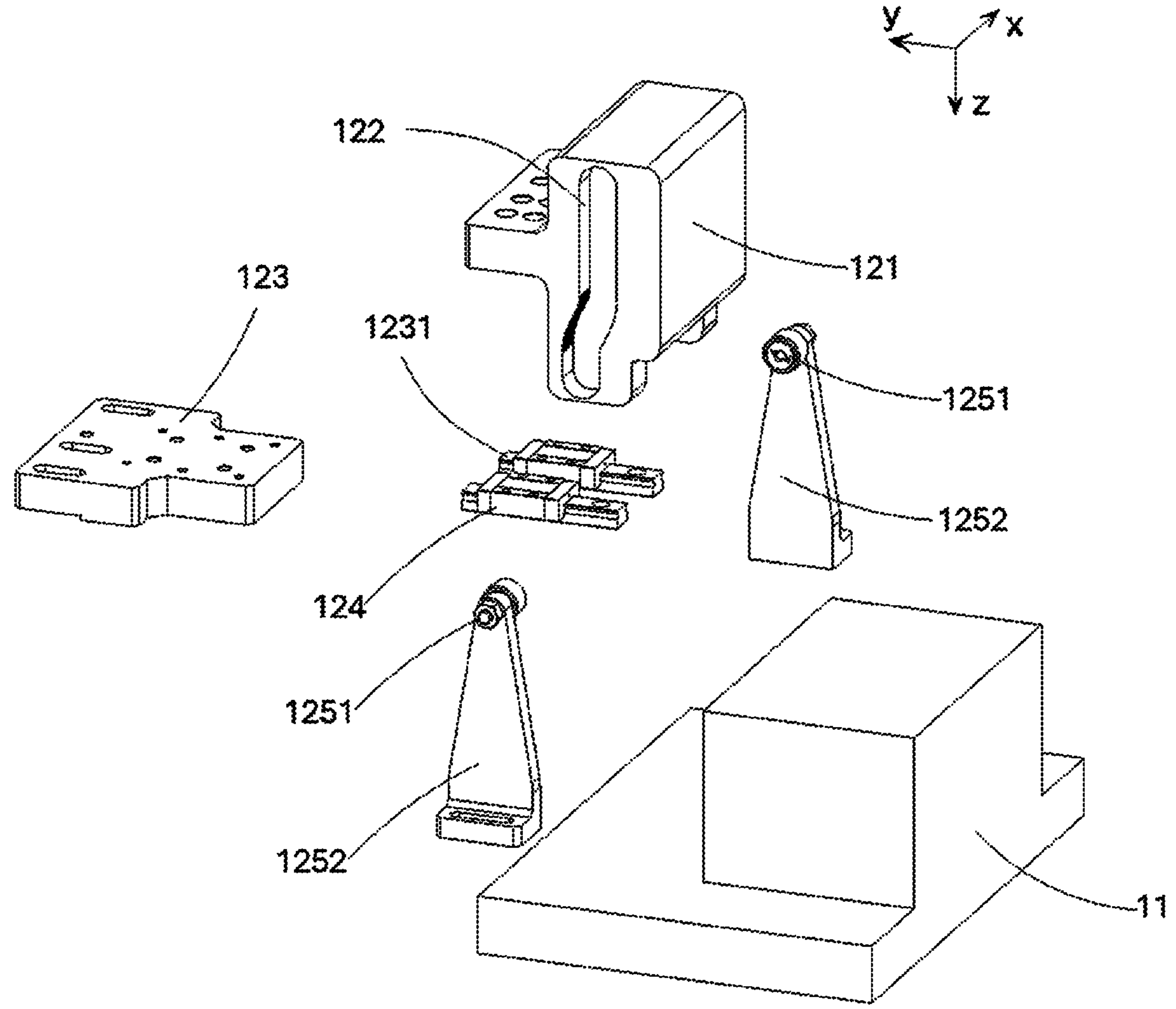
FIG. 4 is an exploded view of a push mechanism according to an embodiment of this application.

In some embodiment, referring to FIG. 3 and FIG. 4, the push assembly 12 further includes a slider fixing plate 123, a first slider 124, and a cam assembly 125, where a first sliding rail 1231 is disposed on the slider fixing plate 123, the first slider 124 fits with the first sliding rail 1231 and slides along an extension direction of the first sliding rail 1231, and the push block 121 is fixed onto the first slider 124; and the cam assembly 125 includes a cam 1251 fitting with the restraint groove, the cam 1251 slides along an extension direction of the restraint groove, and the cam 1251 and the restraint groove fit with each other to limit the position of the push block 121. The cam 1251 is disposed on the substrate 11 through a cam mounting plate 1252, and the cam mounting plate 1252 is configured to fix the cam 1251.

In this embodiment, the first slider 124 fits with the first sliding rail 1231 so as to limit displacement of the push block 121 in another direction. The restraint groove is used to limit movement of the push block 121 in the vertical direction (as indicated by the arrow z in the figure), and the push block 121 can move along the extension direction of the first sliding rail 1231 (as indicated by the arrow y in the figure), so that the push function of the push block 121 is implemented. The push position of the push block 121 is limited by the shape range of the restraint groove and therefore the push position is fixed.

In this way, the push block 121 is so disposed on the slider fixing plate 123 through fitting of the first slider 124 and the first sliding rail 1231 that the push block 121 can push the battery cell 5. The cam 1251 slides in the restraint groove through fitting of the cam 1251 and the restraint groove so as to limit the position of the push block 121, so that the push block 121 experiences neither understroke nor overstroke.

In this embodiment, the driving unit 4 is configured to drive the push block 121 to slide along the extension direction of the first sliding rail 1231 while driving the cam 1251 to slide along the extension direction of the restraint groove, to push the battery cell 5 on the substrate 11.

In specific use, the driving unit 4 drives the slider fixing plate 123 to move upward along the vertical direction (as indicated by the arrow z in the figure), so that the cam 1251 moves downward along the shape of the restraint groove. When moving upward, the push block 121 pushes the battery cell 5 along the extension direction of the first sliding rail 1231 (as indicated by the arrow y in the figure). The driving unit 4 drives the slider fixing plate 123 to move downward along the vertical direction (as indicated by the arrow z in the figure), so that the cam 1251 moves upward along the shape of the restraint groove. When moving downward, the push block 121 draws back along the extension direction of the first sliding rail 1231 (as indicated by the arrow y in the figure), leaving the battery cell 5. The shape of the restraint groove and the displacement distance of the cam 1251 are both accurately calculated based on the battery cell 5, and finally the position of the push block 121 can be accurately controlled.

In this way, when the driving unit 4 pushes the cam 1251 to slide in the extension direction of the restraint groove, the position of the push block 121 is limited by the restraint groove, implementing that the push block 121 slides along the first sliding rail 1231 to push the battery cell 5. This limits and accurately controls the position of the push block 121, and implements the push function as well.

Figure 5:
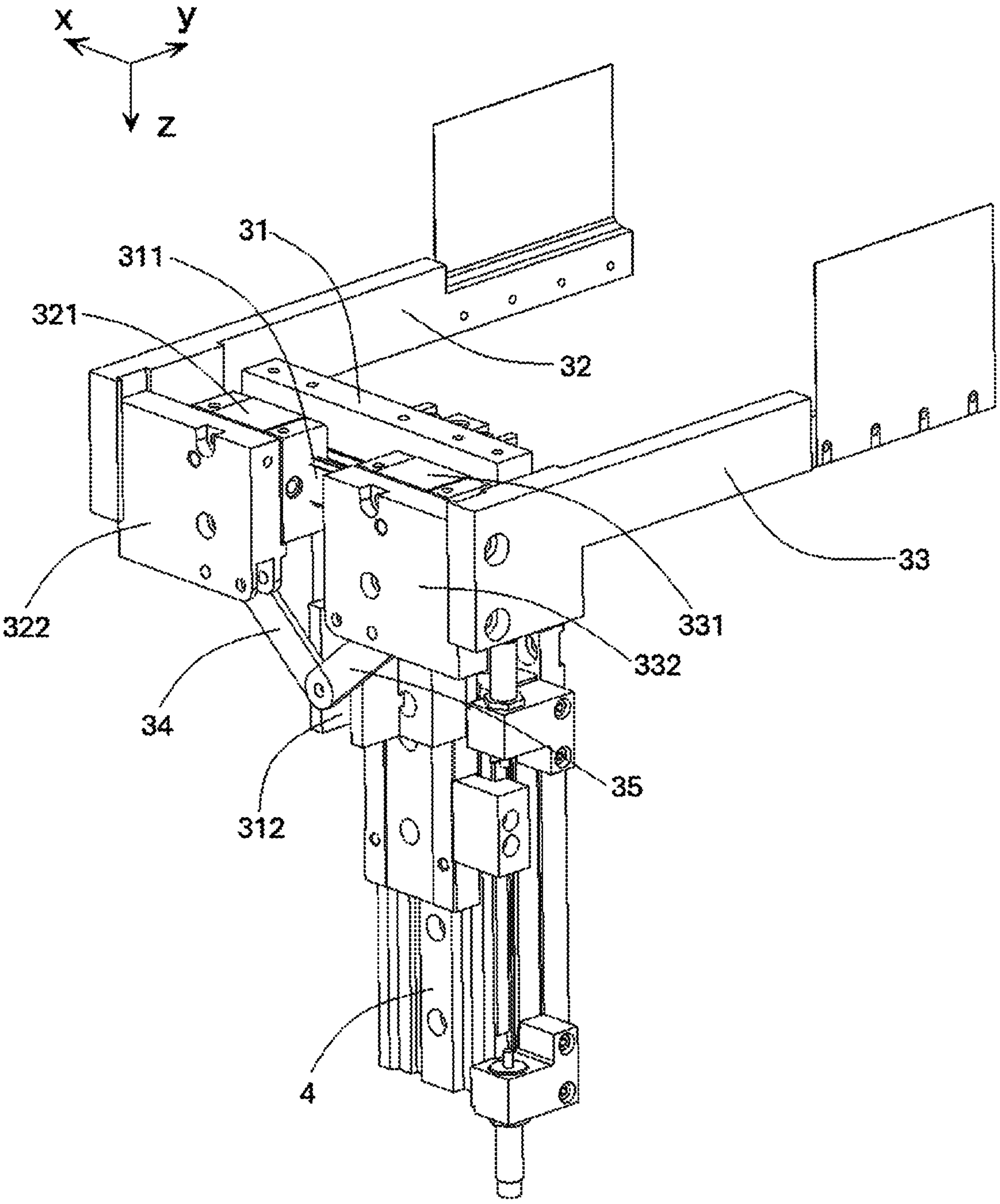
FIG. 5 is a three-dimensional diagram of an edge folding mechanism according to an embodiment of this application.
Figure 6:
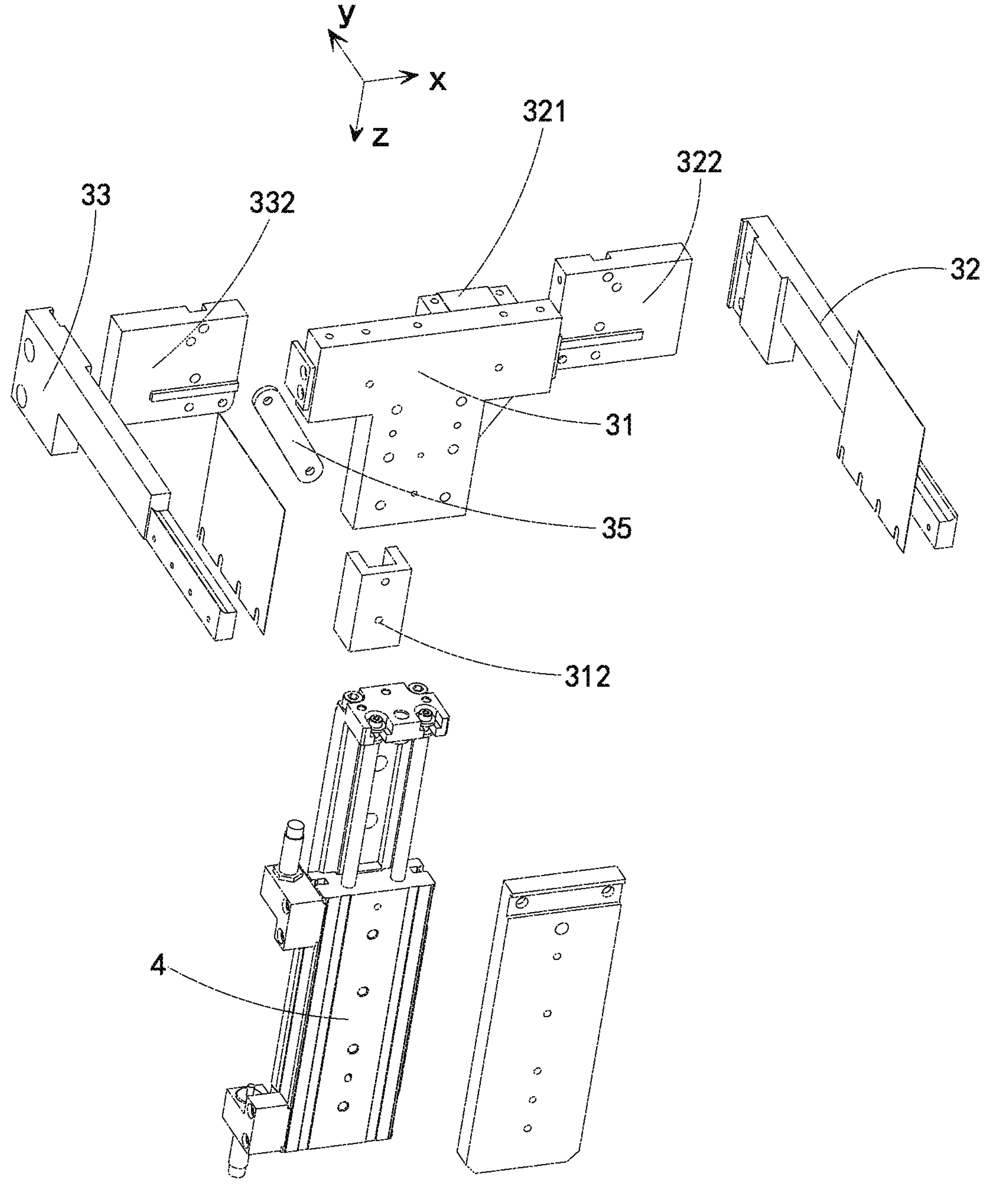
FIG. 6 is an exploded view of an edge folding mechanism according to an embodiment of this application.

In some embodiments, referring to FIG. 5 and FIG. 6, the edge folding mechanism 3 includes a connecting plate 31, a first edge folding assembly 32, and a second edge folding assembly 33, where a second sliding rail 311 is disposed on the connecting plate 31, the first edge folding assembly 32 is disposed on the second sliding rail 311 through a second slider 321, the second edge folding assembly 33 is disposed on the second sliding rail 311 through a third slider 331, and the driving unit 4 is configured to drive the first edge folding assembly 32 and the second edge folding assembly 33 to approach or leave each other to fold the edge of the insulating film wrapped around the battery cell 5. The first edge folding assembly 32 and the second edge folding assembly 33 are a same symmetrical structure.

In this way, the first edge folding assembly 32 is disposed on the second sliding rail 311 through the second slider 321, the second edge folding assembly 33 is disposed on the second sliding rail 311 through the third slider 331, and the driving unit 4 can simultaneously drive the first edge folding assembly 32 and the second edge folding assembly 33 to approach or leave each other to fold the edge of the insulating film wrapped around the battery cell 5 and automatically control edge folding.

In some embodiments, the first edge folding assembly 32 includes a first hinged fixing plate 322, the first hinged fixing plate 322 is disposed on the second slider 321, the second edge folding assembly 33 includes a second hinged fixing plate 332, and the second hinged fixing plate 332 is disposed on the third slider 331; and the edge folding mechanism 3 further includes a first hinge plate 34 and a second hinge plate 35, where one end of the first hinge plate 34 is hinged with the first hinged fixing plate 322, the other end of the first hinge plate 34 is hinged with one end of the second hinge plate 35, and the other end of the second hinge plate 35 is hinged with the second hinged fixing plate 332.

The driving unit 4 can drive the first edge folding assembly 32 and the second edge folding assembly 33 to leave or approach each other by driving only the first hinge plate 34 or the second hinge plate 35 to move up and down along the vertical direction (as indicated by the arrow z in the figure), so that the first edge folding assembly 32 and the second edge folding assembly 33 synchronously move, improving edge folding efficiency.

In this way, as the first hinge plate 34 and the second hinge plate 35 are respectively hinged with the first hinged fixing plate 322 and the second hinged fixing plate 332, and the first hinge plate 34 and the second hinge plate 35 are hinged with each other, provided that the first hinge plate 34 or the second hinge plate 35 is driven to move, the second slider 321 and the third slider 331 can be driven to slide on the second sliding rail 311, and the first edge folding assembly 32 and the second edge folding assembly 33 are driven to approach or leave each other so as to automatically control edge folding and increase edge folding efficiency.

In some embodiments, a hinge guide slot 312 is disposed on the connecting plate 31, and a joint of the first hinge plate 34 and the second hinge plate 35 moves up and down in the hinge guide slot 312 through a guiding shaft, so as to drive the first edge folding assembly 32 and the second edge folding assembly 33 to slide on the second sliding rail 311.

In this embodiment, the hinge guide slot 312 extends along the vertical direction (as indicated by the arrow z in the figure) and may limit a position of the guiding shaft, so that the guiding shaft can move up and down only along the vertical direction (as indicated by the arrow z in the figure), increasing stability of the first edge folding assembly 32 and the second edge folding assembly 33.

In this way, as the position of the guiding shaft is limited through the hinge guide slot 312, the first edge folding assembly 32 and the second edge folding assembly 33 can be driven to slide on the second sliding rail 311 through the second slider 321 and the third slider 331 provided that the guiding shaft is driven to move up and down in the hinge guide slot 312, so that the first edge folding assembly 32 and the second edge folding assembly 33 approach or leave each other, improving stability of edge folding.

In this embodiment, the driving unit 4 is configured to drive the push block 121 to push the battery cell 5 on the substrate 11 while driving the guiding shaft to move up and down in the hinge guide slot 312.

In specific use, the driving unit 4 drives the slider fixing plate 123 to move upward along the vertical direction (as indicated by the arrow z in the figure), so that the push block 121 pushes the battery cell 5. In addition, the driving unit 4 drives the guiding shaft to move upward along the vertical direction (as indicated by the arrow z in the figure), so that the first edge folding assembly 32 and the second edge folding assembly 33 leave each other.

The driving unit 4 drives the slider fixing plate 123 to move downward along the vertical direction (as indicated by the arrow z in the figure), so that the push block 121 draws back from the battery cell 5 and leaves the battery cell 5. In addition, the driving unit 4 drives the guiding shaft to move downward along the vertical direction (as indicated by the arrow z in the figure), so that the first edge folding assembly 32 and the second edge folding assembly 33 approach each other. In this way, one driving unit 4 simultaneously drives two mechanisms to move, so that one driver unit is saved, thereby reducing costs and improving production efficiency.

In this way, the driving unit 4 can drive two mechanisms to move. To be specific, the driving unit 4 can drive the first edge folding assembly 32 and the second edge folding assembly 33 to fold an edge, and the push block 121 to push the battery cell 5 on the substrate 11. This can save one driver unit, thereby reducing parts.

Figure 7:
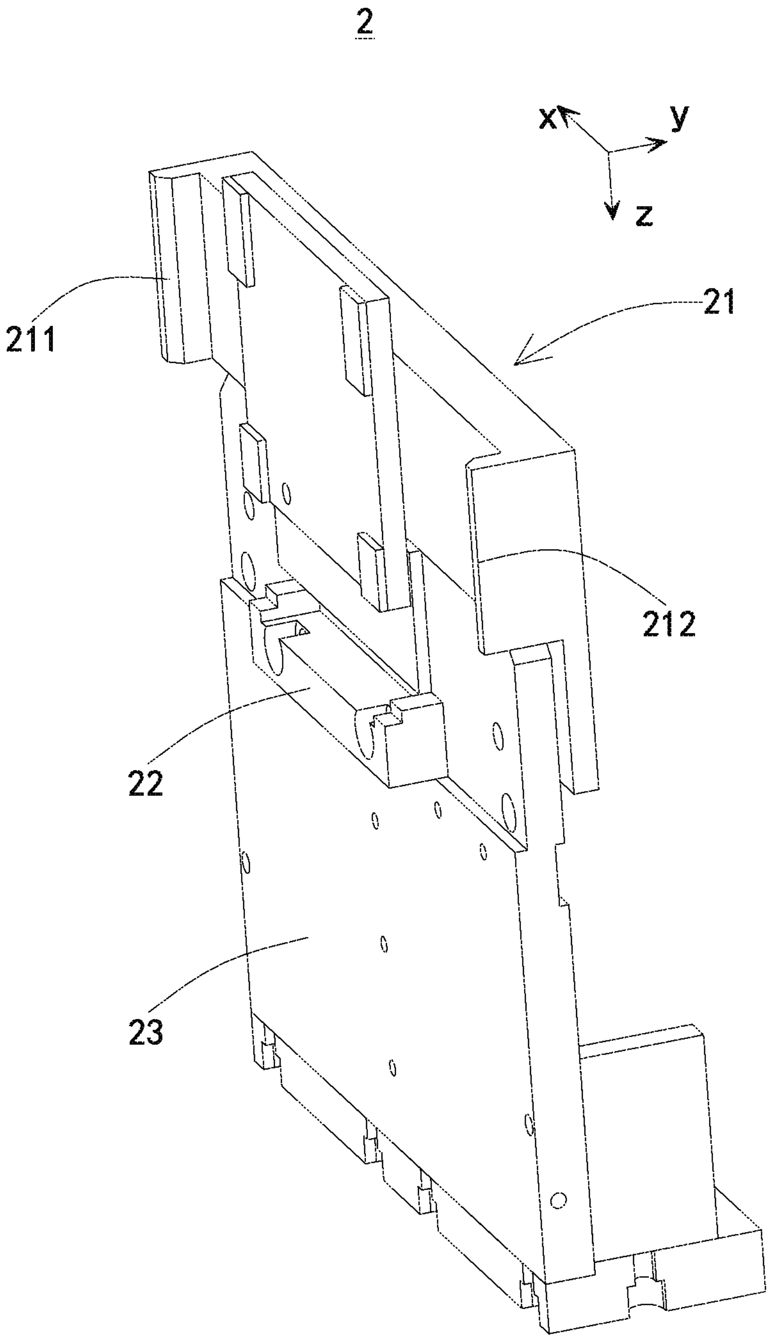
FIG. 7 is a schematic structural diagram of a defining mechanism according to an embodiment of this application.

In some embodiments, referring to FIG. 7, the defining mechanism 2 includes a restraint base 23 and a first restraint block 21 disposed on the restraint base 23, and the first restraint block 21 includes a second restraint portion 211 and a third restraint portion 212 that are configured to limit the battery cell 5 to move in a horizontal direction.

In this embodiment, the second restraint portion 211 and the third restraint portion 212 are configured to limit poles on the battery cell 5, the second restraint portion 211 and the third restraint portion 212 are located on two sides of the poles on the battery cell 5 and used to limit displacement of the battery cell 5 in the length direction of the battery cell 5 (as indicated by the arrow x in the figure). In this way, the second restraint portion 211 and the third restraint portion 212 can limit movement of the battery cell 5 in the horizontal direction, which is convenient to attach the insulating film onto the battery cell 5.

In some embodiments, the defining mechanism 2 further includes a second restraint block 22 disposed on the restraint base 23, and the second restraint block 22 is configured to limit the battery cell 5 to move in a vertical direction. An avoidance space for an explosion-proof valve of the battery cell 5 is provided on the top of the second restraint block 22. In this way, the second restraint block 22 is configured to limit movement of the battery cell 5 in the vertical direction so as to limit the position of the battery cell 5 in the vertical direction, ensuring that the position of the battery cell 5 is fixed.

In this way, the moving position of the push block 121 is limited by the first restraint portion 122 in this embodiment, so that the push block 121 experiences neither understroke nor overstroke, and thus neither insufficient battery push nor collision damage to the battery cell 5 occurs, thereby effectively reducing safety accidents caused by collision damage to the battery cell 5.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A device for wrapping an insulating film around a battery cell, the device comprising:

- a push mechanism, wherein the push mechanism comprises a substrate for holding a battery cell and a push assembly disposed on the substrate, the push assembly comprises a push block, the push block being provided with a restraint groove, and the push assembly further comprises:
  - a first sliding rail; and
  - a cam assembly comprising a cam fitting with the restraint groove, the cam sliding along an extension direction of the restraint groove and fitting with the restraint groove to limit a position of the push block;
- a defining mechanism, wherein the defining mechanism is disposed on a side of the substrate, and the defining mechanism comprises a restraint base and at least one restraint block configured to limit movement of the battery cell on the substrate;
- an edge folding mechanism, wherein the edge folding mechanism is disposed opposite the push mechanism, and the edge folding mechanism is configured to fold an edge of an insulating film wrapped around the battery cell; and
- a driving unit, wherein the driving unit is configured to drive the edge folding mechanism to fold the edge of the insulating film wrapped around the battery cell and drive the push block to slide along an extension direction of the first sliding rail while driving the cam to slide along the extension direction of the restraint groove to push the battery cell on the substrate.

2. The device according to claim 1, wherein the push assembly further comprises a slider fixing plate, and a first slider wherein the first sliding rail is disposed on the slider fixing plate, the first slider fits with the first sliding rail and is capable of sliding along the extension direction of the first sliding rail, and the push block is fixed onto the first slider.

3. The device according to claim 1, wherein the at least one restraint block further comprises a second restraint block disposed on the restraint base, and an avoidance space for an explosion-proof valve of the battery cell is provided on a top of the second restraint block.

4. The device according to claim 1, wherein the cam is disposed on the substrate through a cam mounting plate, and the cam mounting plate is configured to fix the cam.

5. The device according to claim 1, wherein the restraint groove is configured to limit movement of the push block in a vertical direction while the push block moves along the extension direction of the first sliding rail.

6. The device according to claim 1, wherein the at least one restraint block comprises a first restraint block disposed on the restraint base, and the first restraint block comprises a second restraint portion and a third restraint portion that are configured to limit movement of the battery cell in a horizontal direction.

7. The device according to claim 6, wherein the at least one restraint block of the defining mechanism further comprises a second restraint block disposed on the restraint base, and the second restraint block is configured to limit movement of the battery cell in a vertical direction.

8. The device according to claim 6, wherein the second restraint portion and the third restraint portion are located on two sides of poles of the battery cell and are configured to limit displacement of the battery cell in a length direction of the battery cell.

9. The device according to claim 1, wherein the edge folding mechanism comprises a connecting plate, a first edge folding assembly, and a second edge folding assembly, wherein a second sliding rail is disposed on the connecting plate, the first edge folding assembly is disposed on the second sliding rail through a second slider, the second edge folding assembly is disposed on the second sliding rail through a third slider, and the driving unit is configured to drive the first edge folding assembly and the second edge folding assembly to approach or leave each other to fold the edge of the insulating film wrapped around the battery cell.

10. The device according to claim 9, wherein the first edge folding assembly comprises a first hinged fixing plate, the first hinged fixing plate is disposed on the second slider, the second edge folding assembly comprises a second hinged fixing plate, and the second hinged fixing plate is disposed on the third slider; and the edge folding mechanism further comprises a first hinge plate and a second hinge plate, wherein one end of the first hinge plate is hinged with the first hinged fixing plate, the other end of the first hinge plate is hinged with one end of the second hinge plate, and the other end of the second hinge plate is hinged with the second hinged fixing plate.

11. The device according to claim 10, wherein a hinge guide slot is disposed on the connecting plate, and a joint of the first hinge plate and the second hinge plate moves up and down in the hinge guide slot through a guiding shaft, so as to drive the first edge folding assembly and the second edge folding assembly to slide on the second sliding rail.

12. The device according to claim 11, wherein the driving unit is configured to drive the push block to push the battery cell on the substrate while driving the guiding shaft to move up and down in the hinge guide slot.

13. The device according to claim 11, wherein the hinge guide slot extends along a vertical direction and limits movement of a guiding shaft to the vertical direction.

* * * * *